United States Patent [19]

Nishimura et al.

[11] Patent Number: 5,154,247
[45] Date of Patent: Oct. 13, 1992

[54] LOAD CELL

[75] Inventors: Yoshinobu Nishimura; Hiroshi Tanaka, both of Tokyo; Naoji Nakamura, Sendai, all of Japan

[73] Assignee: Teraoka Seiko Co., Limited, Tokyo, Japan

[21] Appl. No.: 605,326

[22] Filed: Oct. 30, 1990

[30] Foreign Application Priority Data

Oct. 31, 1989 [JP] Japan .................................. 1-285530
Aug. 6, 1990 [JP] Japan .................................. 2-208652

[51] Int. Cl.⁵ .......................... G01G 3/14; G01G 3/08; G01L 1/22
[52] U.S. Cl. .................................... 177/211; 177/229; 73/862.65; 338/5
[58] Field of Search ............................ 177/211, 229; 73/862.65; 338/5

[56] References Cited

U.S. PATENT DOCUMENTS

| | | | |
|---|---|---|---|
| 3,742,418 | 6/1973 | Randolph, Jr. | 335/5 |
| 4,104,605 | 8/1978 | Boudreaux et al. | 338/5 X |
| 4,291,776 | 9/1981 | Kupper et al. | 177/211 X |
| 4,633,212 | 12/1986 | Johnson | 338/5 X |
| 4,712,628 | 12/1987 | Van den Brug | 177/211 |
| 4,737,756 | 4/1988 | Bowman | 335/5 X |
| 4,903,000 | 2/1990 | Yajima et al. | 338/5 |
| 4,970,487 | 11/1990 | Tsukahara et al. | 338/5 |

FOREIGN PATENT DOCUMENTS 61-15914 1/1986 Japan.
63-273029 11/1988 Japan.
63-317728 12/1988 Japan.

Primary Examiner—George H. Miller, Jr.
Attorney, Agent, or Firm—Armstrong & Kubovcik

[57] ABSTRACT

Disclosed herein is a load cell provided with a high-precision load-sensing member of ceramic on which are formed patterns of thin-film resistance for strain gages which are not subject to breakage and variation of resistance. The load cell comprises a bending beam of ceramic material and strain gages of thin-film resistance formed thereon, with the bending beam having a surface coated with amorphous glass on which are formed said strain gages of thin-film resistance. The strain gages are formed from an alloy composed of iron and one or more selected from chromium, cobalt, tungsten, molybdenum, niobium, and tantalum, and a small amount of impurities.

12 Claims, 7 Drawing Sheets

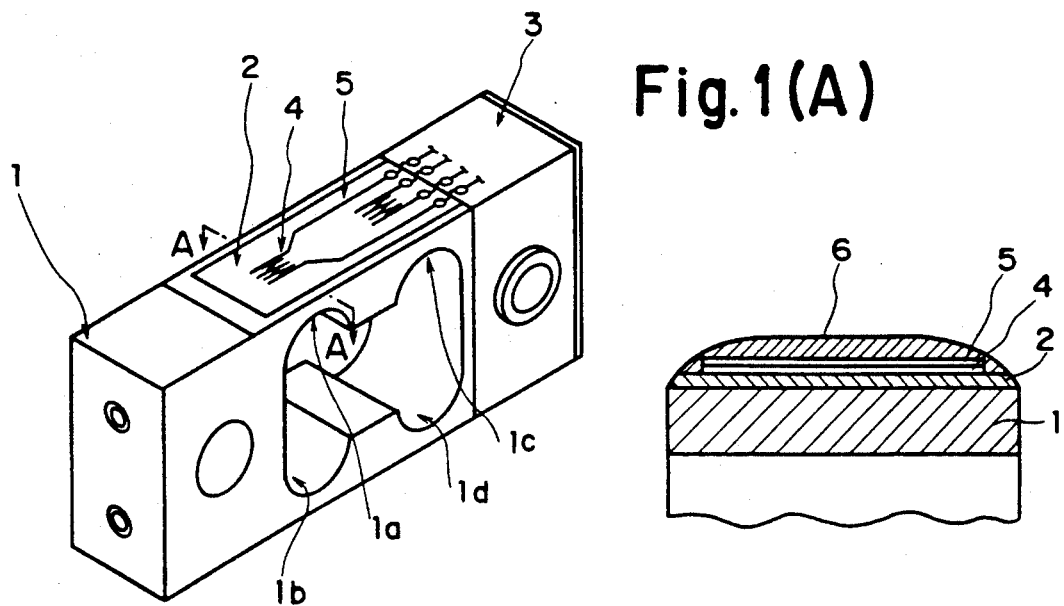
Fig. 1(A)
Fig. 1(B)
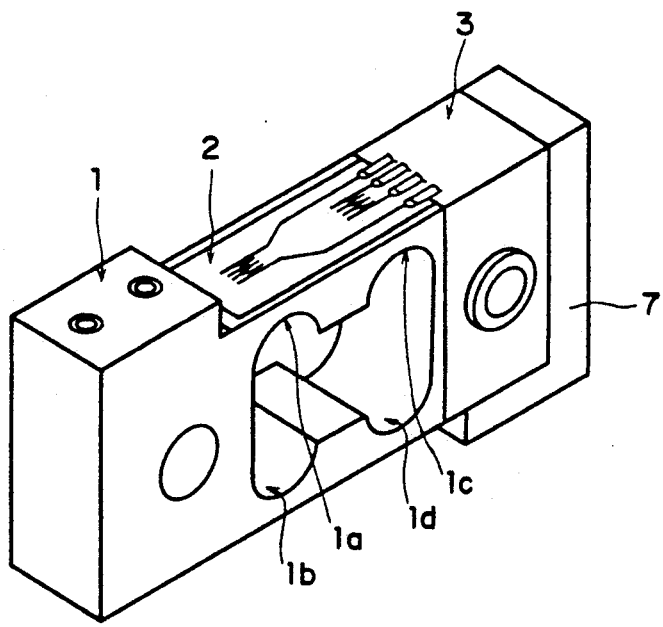
Fig. 2

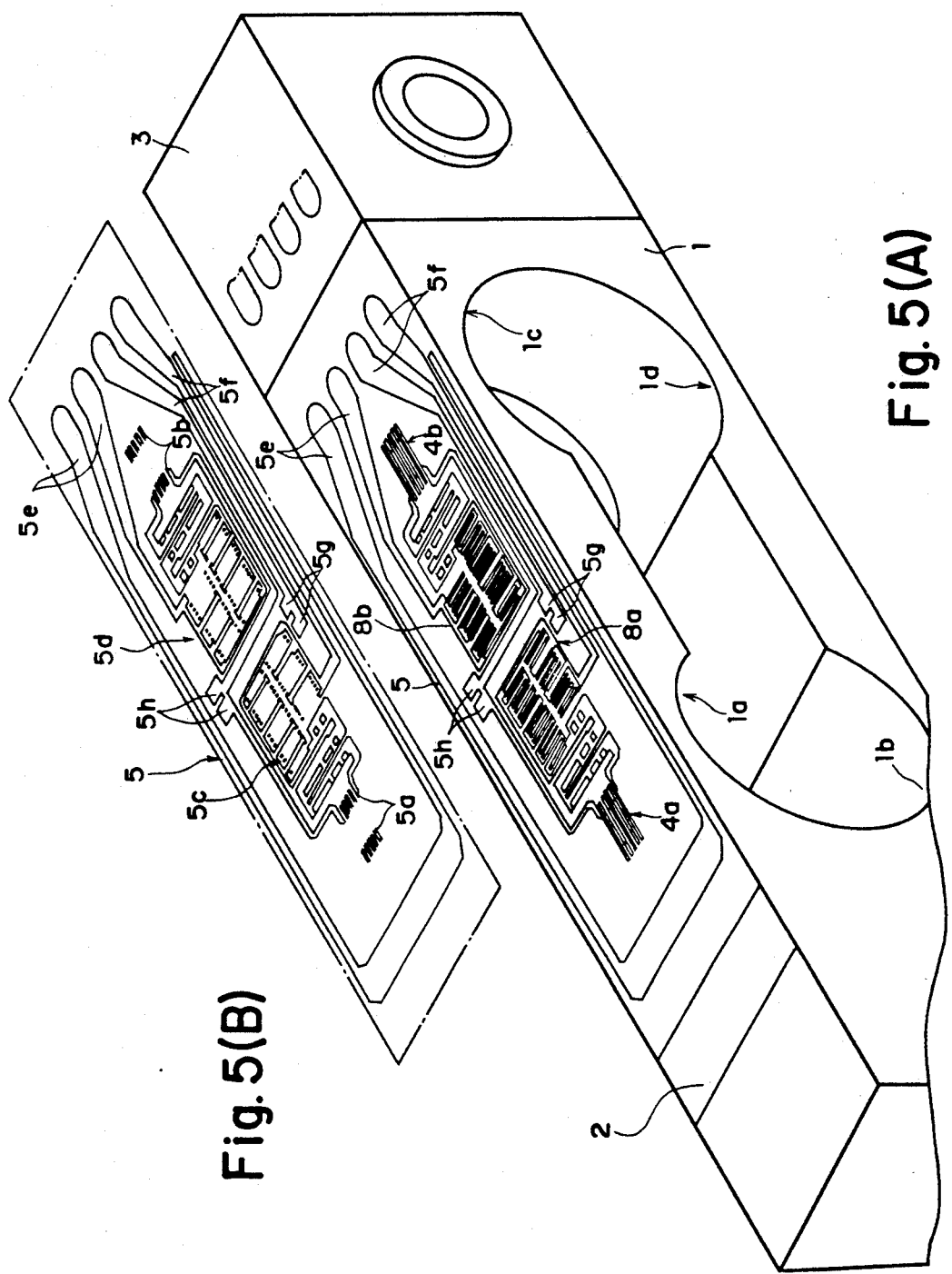

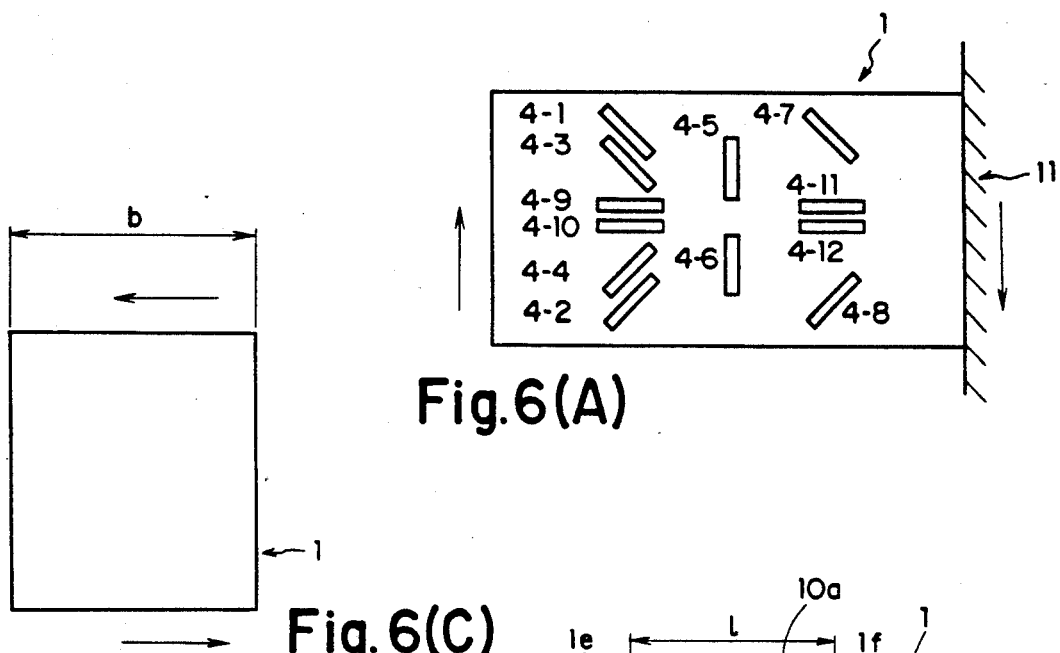
Fig. 6(A)
Fig. 6(C)
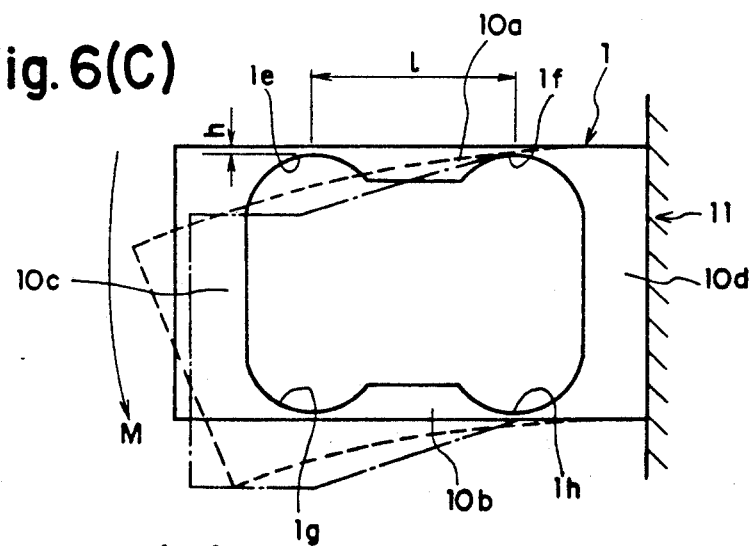
Fig. 6(B)

LOAD CELL

BACKGROUND OF THE INVENTION

1. Field of the Invention

The present invention relates to a load cell in which at least the load-sensing member (deflecting part) of the bending beam is made of a ceramic material.

2. Description of the Prior Art

A load cell of this type is disclosed in Japanese Patent Laid-open No. 273029/1988. It is made up of a ceramic bending beam and strain gages of thin-film resistance formed thereon. Owing to its ceramic bending beam, this load cell has an advantage that it is immune against plastic deformation, very little sensitive to temperature, and highly resistant to any environment. Another advantage of this load cell is that it permits a resistance pattern (for strain gage) to be formed directly on the surface of the ceramic bending beam so that deflection is easily transmitted to the strain gage. The load cell of this structure, therefore, provides improved linearity, creep resistance, hysteresis, and repeatability, which are important characteristics for load cells; it permits measurement with a high accuracy.

Unfortunately, a ceramic material has an inherent disadvantage of having a rough surface. An ordinary ceramic material as baked (without grinding) has a surface roughness of $3.0\mu$ $R_z$. A special ceramic material made of alumina (of purity close to 99.9%) has a surface roughness of $1.0\mu$ $R_z$ and $2.0\mu$ $R_z$ before and after grinding, respectively. If this rough surface of a ceramic material is provided with a pattern of thin-film resistance (approximately 0.05 $\mu$m), it will cause pinholes and uneven thickness distribution in the thin-film resistance. This will present the following problems.

The pattern of thin-film resistance is easily broken by concentrated stress.

The pattern of thin-film resistance does not acquire a desired resistance but greatly varies in resistance.

Resistance varies from one point to another in the single pattern of thin-film resistance; this causes shift errors.

The rough surface of a ceramic material cannot be completely eliminated by lapping or polishing. Lapping or polishing removes surface irregularities; but there still remain interstice between ceramic particles and minute pits due to the loss of ceramic particles caused by grinding. Therefore, the surface roughness that can be attained is about $1.5\mu$ $R_z$, or $0.3\mu$ $R_z$ at the best. Moreover, the grinding and lapping of ceramic materials are expensive because they are extremely hard.

The problem of pinhole is solved if a thick-film resistance is formed on the ceramic surface, with the peaks and valleys in the rough surface completely covered. Unfortunately, the resulting thick-film resistance is inferior in follow-up performance to the foil gage. Moreover, the thin-film resistance takes a long time to form, and this leads to a high production cost. Another disadvantage of the strain gage of thin-film resistance is that it has an upper limit in resistance and consumes a large amount of electric power. Therefore, it is not suitable for use in a battery-driven balance.

Incidentally, the surface roughness ($R_z$) is defined by the difference in height and depth between the third highest peak and the third deepest valley that occur in a cross section of prescribed length.

In the meantime, the load cell of ceramic material is inferior to the conventional one of duralmin (A2024) as discussed in the following.

The load cell of alumina ceramic has a Young's modulus ($E_1$) of 37,000 kg/mm$^2$ and a flexural strength of 33 kg/mm$^2$, whereas the load cell of duralmin has a Young's modulus ($E_2$) of 7,350 kg/mm$^2$ and a flexural strength of 33 kg/mm$^2$.

When a compression-tension strain gage is connected to a Wheatstone bridge, the output ($V_{OUT}$) of the bridge is defined by the following equation.

$$V_{OUT} = V_{IN} \cdot K \, \sigma/E \quad (1)$$

$$\sigma = 31 \, w/2 \, bh^2 \text{ (approximate)} \quad (2)$$

where $V_{IN}$ denotes a voltage applied, K denotes a gage factor, E denotes a Young's modulus, 1 denotes a distance in the horizontal direction between two load-sensing members, b denotes the width of a load-sensing member, and h denotes the thickness of a load-sensing member.

Assuming that the load cell of alumina ceramic and the load cell of duralmin are the same in every respect except Young's modulus (both have usually a gage factor of about 2.0 and both are equal in flexural strength), the ratio of the output $V_{OUT1}$ of the ceramic load cell to the output $V_{OUT2}$ of the duralmin load cell is equal to the ratio of the Young's modulus $E_1$ of the ceramic load cell to the Young's modulus $E_2$ of the duralmin load cell, as indicated by the following equation.

$$V_{OUT1}/V_{OUT2} = E_2/E_1 = 7350/37000 \approx 1/5$$

In other words, the output $V_{OUT1}$ of the ceramic load cell is one-fifth the output $V_{OUT2}$ of the duralmin load cell. The low output leads to a considerably decreased accuracy of reading after A/D conversion. Assuming that the output is 1 mV for the input of 1 V (in fact, the output of the duralmin load cell is usually 1-2 mV for the input of 1 V), the following equation is obtained.

$$V_{OUT}/V_{IN} = K \, \sigma/E = 10^{-3}$$

$$\sigma = e/K \times 10^{-3}$$

If the load cell of alumina ceramic is to be used under the same condition as above (i.e., 1 mV output for 1 V input), $$\sigma = 37000/2.0 \times 10^{-3} = 18.5 \text{ kg/mm}^2$$

This means that the load cell of alumina ceramic receives an extremely high stress and has a safety factor lower than 2-fold. Under such a situation, the load cell will be broken by a very small impact and will not withstand bending moment and torsional moment except a vertical downward force.

In fact, the stress is higher than this (by about 20%) in the case where output is 1 mV for the input of 1 V. This is because a resistor for temperature compensation is inserted into the input side of the Wheatstone bridge. Therefore, the load cell will give the same safety factor and output as before if it has a gage factor close to 10.

It is empirically known that the load-sensing member of a duralmin load cell can be made as thin as about 0.5 mm, whereas in the case of ceramic load cell, the lower limit of the thickness of the load-sensing member is about 1 mm. It follows, therefore, that the rated load for the ceramic load cell is four times that of the duralmin load cell, at the lowest. In other words, the ceramic load cell cannot measure the weight lower than that rated load.

Despite the advantages of ceramics (as mentioned above), any load cell provided with a load-sensing member of ceramics has not yet been put to practical use.

SUMMARY OF THE INVENTION

The present invention was completed to eliminate the above-mentioned disadvantages. It is an object of the present invention to provide a load cell equipped with a high-precision load-sensing member of ceramic on which are formed patterns of thin-film resistance which are not subject to breakage and variation of resistance.

It is another object of the present invention to provide a highly practical load cell in which the bending beam is entirely made of a ceramic material or at least the load-sensing member is made of a ceramic material having outstanding characteristic properties.

The load cell of the present invention comprises a bending beam of ceramic material and strain gages of thin-film resistance formed thereon, with the bending beam having a surface coated with amorphous glass at least on which are formed said strain gages of thin-film resistance.

The load cell of the present invention comprises a bending beam at least the load-sensing member of which is made of a ceramic material and strain gages, with the bending beam having a surface which is polished or coated with amorphous glass on which are formed strain gages by deposition or sputtering directly from an alloy composed of iron and one or more selected from chromium, cobalt, tungsten, molybdenum, niobium, and tantalum, and a small amount of impurities.

The load cell of the present invention comprises a load-sensing member and strain gages, with the load-sensing member having an upper or lower surface on which the strain gages are formed together with other gages each for detecting torsional moment and bending moment.

BRIEF DESCRIPTION OF THE DRAWINGS

FIG. 1(A) is an external view of the load cell of the present invention which has a bending beam of ceramics.

FIG. 1(B) is a sectional view taken along the line A—A in the direction of arrows.

FIGS. 2 to 4 are perspective and plan views showing other load cells pertaining to the present invention which have a bending beam of ceramics.

FIGS. 5(A) and (B) are detail views showing the patterns formed on the surface of the ceramic bending beam.

FIGS. 6(A), 6(B), and 6(C) are a plan view, front view, and right side view of the load cell of the present invention, respectively.

DESCRIPTION OF THE PREFERRED EMBODIMENTS

Figure 3:
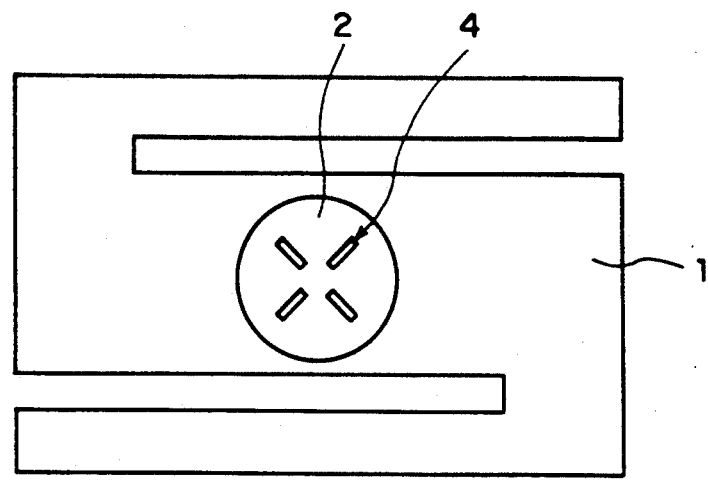

According to the present invention, the load cell having a bending beam of ceramics is constructed as explained in the following.

The load cell of the present invention is shown in FIG. 1(A) (external appearance) and FIG. 1(B) (section taken along the line A—A). In FIG. 1(A), there is shown a bending beam 1 made of a ceramic material. The bending beam has at its center a hollow having four flat surfaces and four curved surfaces (1a, 1b, 1c, and 1d) as shown. That part of the bending beam in which the curved parts of the hollow are formed functions as the load-sensing member. The upper and lower surfaces of the ceramic bending beam 1 which enclose the load-sensing member are provided with an amorphous glass coating 2. On the amorphous glass coating 2 are formed a strain gage 4 of thin-film resistance and a wiring patter 5 connected to the strain gage 4. The strain gage 4 and wiring pattern 5 are formed by etching simultaneously a constantan foil and a copper foil formed on top of the other on the glass coating 2. The strain gage 4 and wiring pattern 5 may be covered with a moistureproof layer 6 of silicone rubber or butyl rubber for the protection against water and moisture.

The supporting end of the ceramic bending beam 1 is provided with a flexible board 3 which is connected (soldered) to the terminals of the wiring pattern 5 formed on the upper and lower surfaces of the ceramic bending beam 1.

A ceramic material is suitable for the bending beam of a load cell on account of its high creep resistance, very little hysteresis, good linearity, and very small change in elastic modulus at high temperatures. However, a ceramic product as baked has a rough surface. According to the present invention, the rough surface is eliminated by forming a glass coating 2 on it. Owing to its extremely smooth surface, the glass coating 2 permits a constantan thin film to be formed thereon without causing pinholes and uneven thickness distribution. The constantan thin film can be made into a high-precision strain gage 4 by etching. It is possible to form a well-balanced bridge from a plurality of the strain gages 4 having uniform resistance. The glass coating 2 formed on the surface of the ceramic bending beam 1 has no adverse effect on the strain gage to be formed thereon, because glass is comparable to ceramics in characteristic properties. The load cell having a thin-film resistance on the glass coating 2 as mentioned above has the following advantages.

Being an insulating material, the ceramic bending beam 1 and glass coating 2 obviate the need of placing an insulating base under the strain gage, unlike the bending beam made of metal (such as high-strength aluminum). The glass coating 2 is merely intended to smoothen the surface of the ceramic bending beam 1, but is not intended to provide insulation; therefore, the glass coating 2 can be very thin. The thin-film resistance constituting the strain gage 4 is very thin (hundredths of the thickness of foil gage which is several microns thick). Therefore, the thin-film resistance follows very easily the deflection that takes place in the load-sensing member of the ceramic bending beam 1, and hence it produces an electrical output which reflects the outstanding characteristic properties of ceramics. The glass coating 2 is usually formed by screen printing process or the like, from a comparatively soft amorphous glass (which can be baked at about 500° C.) because the load cell is not used at high temperatures in many cases. Amorphous glass leads to a low cost because it dispenses with a complex oven and process. Moreover, amorphous glass provides a much smoother surface free of pinholes than crystalline glass.

Figure 4:
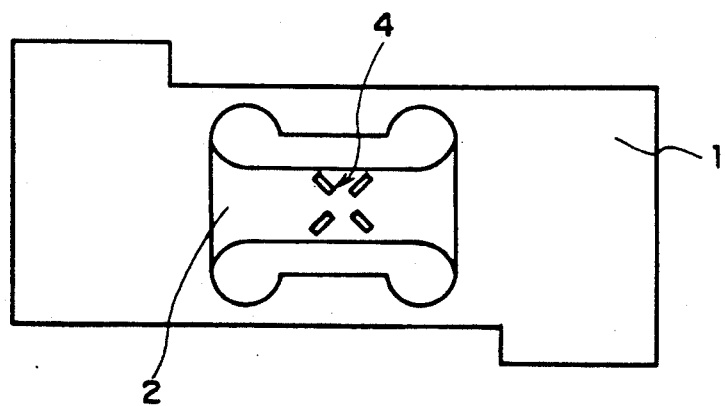

The ceramic bending beam in the present invention is not limited to the one shown in FIG. 1. It may have a configuration as shown in FIGS. 2 to 4. What is required of it is that it permit the glass coating to be formed thereon so that strain gages of thin-film resistance are formed on the glass coating. According to the present invention, the load cells shown in FIGS. 2 to 4 can be advantageously produced owing to the glass coating. In the case of load cells shown in FIGS. 3 and 4, which have the pattern of strain gages formed in the hollow in the load-sensing member of the ceramic bending beam, it is difficult to polish a flat surface for the pattern of strain gages. This difficulty is easily overcome by coating the surface in the hollow with amorphous glass which forms a smooth surface. The same technique can also be applied to the load cell shown in FIG. 2 which has a projection on the surface of the load-sensing member.

According to the present invention, on the glass coating 2 are formed a strain gage pattern and controlling resistor pattern of thin-film resistance and a wiring pattern of copper foil, as shown in FIG. 5. The upper and lower surface of the ceramic bending beam 1 are provided with the amorphous glass coating 2, on which is subsequently formed a constantan or nichrome foil by sputtering, ion plating, plasma coating, or deposition. On the constantan or nichrome foil is further formed in the same manner as above a copper or aluminum foil, with those parts for the strain gage pattern (4a, 4b) and controlling resistor pattern (8a, 8b) covered with a masking film formed thereon. Subsequently, the constantan or nichrome foil and the upper copper or aluminum foil undergo etching to form the strain gage pattern (4a, 4b), controlling resistor pattern (8a, 8b), end tabs (5a, 5b) for the strain gage pattern, end tabs and connection pattern (5c, 5d), and wiring pattern (5e, 5f) simultaneously, as shown in FIGS. 5(A) and 5(B). Finally, these patterns are covered with a moistureproof layer as in the case of FIG. 1.

The ceramic bending beam 1 for the load cell is so hard that it is very difficult to correct errors (which occur when a load is placed off the center of the pan) by shaving off the hollows 1a, 1b, 1c, and 1d, as disclosed in Japanese Patent Application No. 48523/1978. Even though shaving is possible, the shaved part is liable to cracking due to concentrated stress. For the load cell of the present invention, error correction is easily and effectively accomplished by the aid of strain gages to detect bending moment and torsional moment which are formed from thin-film resistance by the same hot etching process as used for the strain gage pattern (4a, 4b), as disclosed in Japanese Patent Laid-open No. 273028/1988. The strain gages to detect bending moment and torsional moment do not add to the production cost because they are formed from the same thin-film resistance as for the strain gage pattern.

Another effective means to correct errors is to add elements to adjust the sensitivity of bending moment and torsional moment in a part of or in the vicinity of the strain gage, as disclosed in Japanese Patent Laid-open No. 317728/1988. Such elements are easy to form, and yet they do not cause a short circuit in case of breakage, because the ceramic bending beam is an insulating body unlike the conventional metal bending beam.

The wiring pattern (5e, 5f) has the terminals (5g, 5h) to which are connected thin chip resistors made of copper, nickel, or platinum for temperature compensation. The thin chip resistors may be replaced by thin-film resistance of copper, nickel, or platinum which is formed by hot etching through a masking layer at the same time when the above-mentioned pattern layers are formed.

In the embodiment shown in FIG. 2, the pattern formed on the upper and lower surfaces of the ceramic bending beam 1 is connected to the flexible board 3 having a wiring copper foil extending beyond the insulating base. Connection will be easily accomplished by soldering, with the wiring copper foil superposing on the terminals of the pattern.

In the embodiments shown in FIGS. 1 to 5, the upper and lower surfaces of the ceramic bending beam 1 are provided with a glass coating 2 and several patterns are formed on the glass coating, as mentioned above. The patterns may be provided with a ceramic or glass coating afterwards. The coating imparts good moisture resistance and chemical resistance to the load cell. This is possible only with the load cell of the present invention having the ceramic bending beam. For the conventional load cell having the metal bending beam, the ceramic or glass coating will have an adverse effect on the strain gage, even if it can be formed. Moreover, for the conventional load cell in which the strain gage is formed on an insulating base of resin, it is impossible to form the ceramic or glass coating that needs heat treatment at high temperatures.

In the above-mentioned examples, the thin-film resistance is made of constantan or nichrome; but it may be made of any metal which has a great resistivity and a small temperature coefficient. Also, in the above-mentioned examples, the wiring pattern is made of copper or aluminum; but it may be made of any metal which has a small resistivity.

As mentioned above, the load cell of the present invention is characterized in that at least a part of the ceramic bending beam, on which is formed a strain gage of thin-film resistance, is provided with an amorphous glass coating. This feature produces the following marked effects.

(1) The amorphous glass coating provides the ceramic bending beam with an extremely smooth surface, which permits the pinhole-free thin-film resistance to be formed without the need for polishing the surface of the ceramic bending beam. Moreover, the smooth surface prevents the strain gage formed thereon from breakage by concentrated stress and also minimizes the variation of resistance values from one strain gage pattern to another formed thereon. Uniform resistance values lead to a well-balanced bridge and hence contribute to the improved performance of the load cell.

(2) The smooth surface of the glass coating permits strain gages to be formed thereon which have uniform resistance throughout. This minimizes the shift error and instrumental error and improves linearity, reproducibility, and hysteresis.

(3) The amorphous glass coating does not impair the performance of the ceramic bending beam because amorphous glass is as good as ceramics.

The load cell of the present invention may be available in other form of embodiment than mentioned above, which will be explained below with reference to FIG. 6. FIG. 6(A) is a plan view of the load cell. FIG. 6(B) is a front view of the load cell. FIG. 6(C) is a right side view of the load cell.

The load cell shown in FIG. 6 is of cantilever type, with one end of the bending beam 1 fixed to a supporting member 11, and the other end left free. The bending beam 1 is made of a ceramic material. It is made up of an upper beam 10a and lower beam 10b, which are parallel to each other, and connecting members 10c and 10d which connect the upper and lower beams to each other. The upper beam 10a has concaves 1e and 1f, and the lower beam 10b has concaves 1g and 1h. These concave parts function as load-sensing members. The distance between load-sensing members 1e and 1f and the distance between load-sensing members 1g and 1h are both represented by "l". The thickness of the load-sensing members 1e, 1f, 1g, and 1h is represented by "h". The width of the load-sensing members is represented by "b".

On the upper surface of the load-sensing members 1e and 1f of the bending beam 1 are formed strain gages 4-1, 4-2, 4-3, 4-4, 4-5, 4-6, 4-7, 4-8, 4-9, 4-10, 4-11, and 4-12. These strain gages are formed by deposition or sputtering directly from an alloy composed of iron and one or more selected from cobalt, tungsten, molybdenum, niobium, and tantalum, and a small amount of impurities. Before these strain gages are formed, the upper surface of the bending beam is completely polished or provided with an amorphous glass coating, so that the strain gages formed thereon are free of pinholes and uniform in thickness.

The strain gages 4-9 to 4-12, which are arranged parallel to the axis of the bending beam, are designed to detect a load. The strain gages 4-1, 4-2, 4-7, and 4-8, which are arranged at an angle with respect to the axis of the bending beam 1, are designed to detect a torsional moment. The strain gages 4-3 and 4-4, which are arranged at an angle with respect to the axis of the bending beam 1, are designed to detect a bending moment. The strain gages 4-5 and 4-6, which are arranged at the center at right angles with respect to the axis of the bending beam 1, function as dummy resistance.

The strain gages are made of an alloy composed of iron and one or more selected from chromium, cobalt, tungsten, molybdenum, niobium, and tantalum, and a small amount of impurities. No details are mentioned herein about the composition of the alloy and the process for producing the alloy, because they are the same as those disclosed in Japanese Patent Laid-open No. 15914/1986.

Figure 7A:
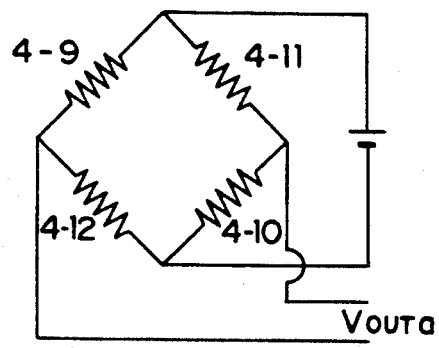
FIGS. 7(A), 7(B), and 7(C) are circuit diagrams for the bridges to detect load, torsional moment, and bending moment applied to the load cell, respectively.

The load cell of the above-mentioned structure functions as follows: When the free end of the bending beam 1 receives a load, the bending beam 1 deforms as indicated by the chain line in FIG. 6(B). This deformation exerts a compressive stress on the load-sensing member 1e and a tensile stress on the load-sensing member 1f. The compressive and tensile stresses act on the strain gages 4-9 to 4-12, causing their resistance values to change. The change in resistance (which is proportional to the magnitude of load applied) can be detected if each of the strain gages 4-9 to 4-12 is incorporated into a Wheatstone bridge as shown in FIG. 7(A).

Figure 7B:
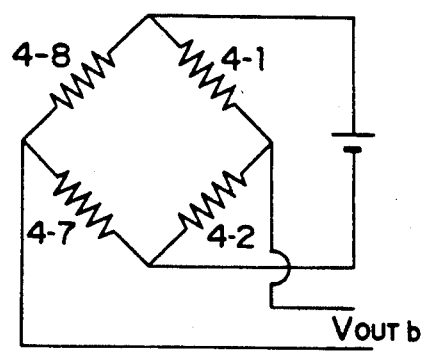

The bending beam 1 of the load cell will receive a torsional moment in the direction of arrows shown in FIGS. 6(A) and 6(C) according to the loading point. This torsional moment exerts a stress on the load-sensing members 1e and 1f, and this stress acts on the strain gages 4-1, 4-2, 4-7, and 4-8, causing their resistance values to change in proportion to the magnitude of stress. If these strain gages are incorporated into a Wheatstone bridge as shown in FIG. 7(B), it is possible to detect the torsional moment.

Figure 7C:
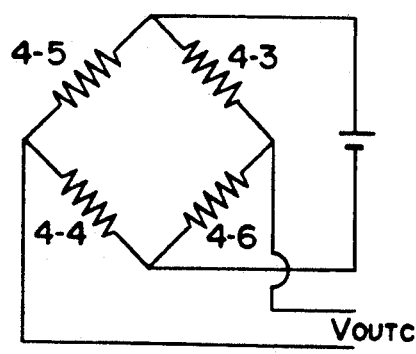
Figure 8A:
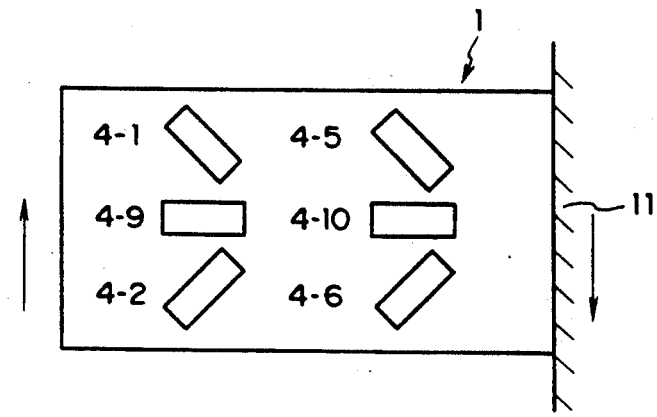
FIGS. 8(A), 8(B), 8(C), and 8(D) are a plan view, front view, right side view, and bottom view of the load cell, respectively.
Figure 8C:
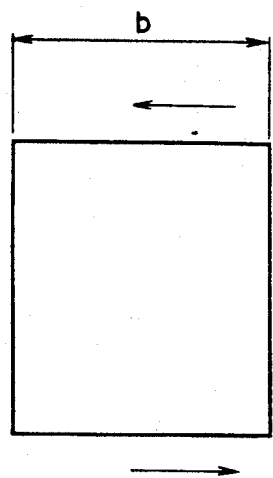
Figure 8B:
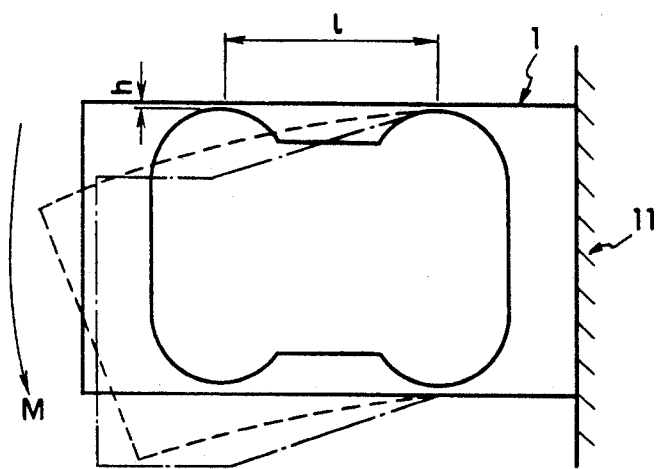
Figure 8D:
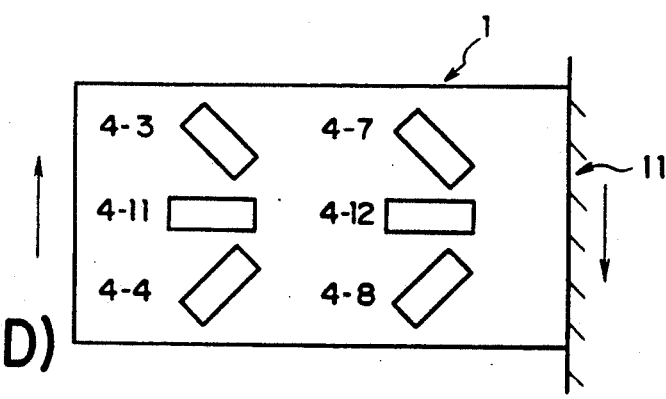

The bending beam 1 of the load cell will receive a bending moment M. In this case, the bending beam deforms as indicated by the broken line in FIG. 6(B). The stress in proportion to the deformation acts on the strain gages 4-3 and 4-4, causing their resistance values to change. If the strain gages 4-3 and 4-4 are incorporated into a Wheatstone bridge as shown in FIG. 7(C), it is possible to detect the bending moment.

The strain gage made of the above-mentioned alloy can be very small to provide an output required because it has a great resistivity. Many such small strain gages can be arranged only on the upper surface of the bending beam. This makes it easy to form the pattern of strain gage and to make wiring, which leads to an improved productivity.

Another embodiment of the load cell of the present invention is shown in FIG. 8. FIG. 8(A) is a plan view of the load cell. FIG. 8(B) is a front view of the load cell. FIG. 8(C) is a right side view of the load cell. FIG. 8(D) is a bottom view of the load cell. This load cell has the bending beam 1 made of the same ceramic material as used for the load cell shown in FIG. 6. The bending beam 1 is provided on its upper and lower surfaces with strain gages 4-1 to 4-12 made of the same material as used for the strain gages shown in FIG. 6. The strain gages 4-9 to 4-12 are designed to detect a load. The strain gages 4-1, 4-2, 4-7, and 4-8 are designed to detect a torsional moment. The strain gages 4-3 to 4-6 are designed to detect a bending moment.

Figure 9A:
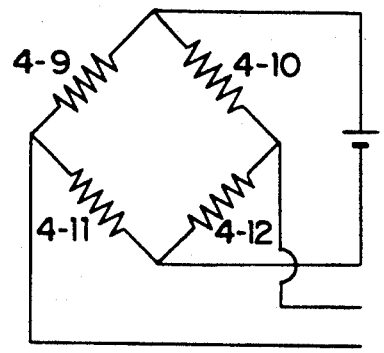
FIGS. 9(A), 9(B), and 9(C) are circuit diagrams for the bridges to detect load, torsional moment, and bending moment applied to the load cell shown in FIG. 8, respectively.
Figure 9B:
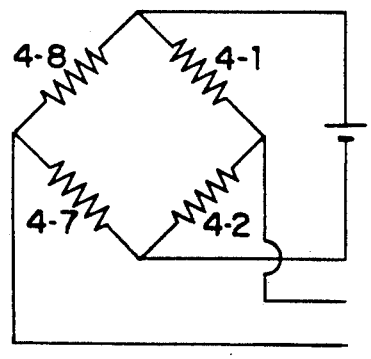
Figure 9C:
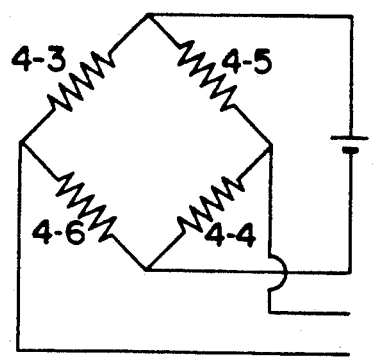

These strain gages constitute bridges as shown in FIGS. 9(A), 9(B), and 9(C) for the detection of load, torsional moment, and bending moment. The bridge as shown in FIG. 9(A) which is made up of the strain gages 4-9 to 4-12 produces an output $V_{OUTa}$ in proportion to the magnitude of load applied. The bridge as shown in FIG. 9(B) which is made up of the strain gages 4-1, 4-2, 4-7, and 4-8 produces an output $V_{OUTb}$ in proportion to the magnitude of torsional moment applied. The bridge as shown in FIG. 9(C) which is made up of the strain gages 4-3 to 4-6 produces an output $V_{OUTc}$ in proportion to the magnitude of bending moment applied.

In the meantime, the strain gages for the load cell of the present invention should preferably be made of the above-mentioned alloy on account of its high gage factor (10), although they may be made of a Cu-Ni alloy, Ni-Cr alloy, Fe-Cr-Al alloy, or Pt alloy, which has conventionally been used for strain gages. These alloys will exhibit an improved gage factor without heat treatment, if the strain gages are made considerably thin.

The load cell of the present invention is not limited to those shown in the embodiments; but it may be of single beam type, shearing stress type, or column type.

In the above-mentioned embodiments, the bending beam is made of alumina ceramics; but it may be made of other ceramic materials such as silicon nitride and zirconia.

As mentioned above, the load cell of the present invention comprises a bending beam at least the load-sensing member of which is made of a ceramic material and strain gages, with the bending beam having a surface which is polished or coated with amorphous glass on which are formed strain gages by deposition or sputtering directly from an alloy composed of iron and one or more selected from chromium, cobalt, tungsten, molybdenum, niobium, and tantalum, and a small amount of impurities. Therefore, it produces the following effects.

(1) Small hysteresis and good linearity, small output variation due to temperature change, high natural frequency, and good corrosion resistance which are attributable to the intrinsic properties of the ceramic material used for the bending beam. The strain gages give a greater output than usual owing to their high gage factor, even when the load-sensing member receives a small stress. Moreover, the load-sensing member can be made thick within the allowable stress. Therefore, the load-sensing member has a sufficient strength and is easy to fabricate. Thus the load cell of the present invention is by far superior to the conventional one having a load-sensing member made of a metal such as aluminum alloy and high tensile strength alloy. Increasing the thickness of the load-sensing member makes feasible the load cell with a small weighing capacity even though it has a ceramic load-sensing member.

(2) Making smooth the surface of the bending beam (on which is formed strain gages) by polishing or by coating with amorphous glass helps form pinhole-free thin-film resistance for the strain gages. Moreover, the smooth surface prevents the strain gages formed thereon from breakage by concentrated stress and also minimizes the variation of resistance values from one strain gage pattern to another formed thereon. Uniform resistance values contribute to the improved performance of the load cell.

(3) The strain gage patterns formed on the smooth surface have uniform internal resistance values. This contributes to the improved linearity, reproducibility, and hysteresis.

(4) The strain gages made of a material having a high resistivity need only a small area for their formation. Therefore, it is possible to form all the necessary strain gages on one side of the bending beam. This facilitates the arrangement of strain gages and leads to the improved productivity. Moreover, it is possible to reduce the width of the bending beam. Thus the present invention provides a high-performance load cell at a low cost.

What is claimed is:

1. A load cell which comprises a bending beam having a load-sensing member of ceramic material and load-detecting strain gages of thin-film resistance, said bending beam having a surface coated with amorphous glass to make the surface of said ceramic load-sensing member smooth and at least on which are formed said strain gages of thin-film resistance, said amorphous glass coating being disposed between said ceramic load-sensing member and said strain gages for increasing uniformity of thickness and resistance of said strain gages.

2. A load cell as claimed in claim 1, wherein the thin-film resistance is made of constantan or nichrome.

3. A load cell as claimed in claim 2, further comprising a moistureproof layer covering said strain gages of thin-film resistance.

4. A load cell as claimed in claim 3, wherein said moistureproof layer comprises ceramic or glass.

5. A load cell as claimed in claim 1, further comprising means for detecting a change in resistance of said strain gages in response to stress exerted on said load cell.

6. A load cell as claimed in claim 5, wherein said means for detecting a change in resistance of said strain gages comprises a Wheatstone bridge.

7. A load cell as claimed in claim 1, wherein said ceramic material comprises alumina, silicon nitride or zirconia.

8. A load cell which comprises a bending beam having a load-sensing member of ceramic material and load-detecting strain gages of thin-film resistance formed thereon, said bending beam having a surface coated with amorphous glass to make the surface smooth and at least on which are formed said strain gages of thin-film resistance;
wherein the bending beam has concave parts each having a concave surface, the concave parts being proximate to the load-sensing members and the strain-gages being formed on the load-sensing members whereby the concave surfaces of the concave parts are coated with the amorphous glass.

9. A load cell which comprises a bending beam at least the load-sensing member of which is made of a ceramic material and load-detecting strain gages, said bending beam having a surface which is coated with amorphous glass to make the surface smooth on which are formed strain gages by deposition or sputtering directly from an alloy composed of iron and one or more selected from chromium, cobalt, tungsten, molybdenum, niobium, and tantalum, and a small amount of impurities.

10. A load cell as claimed in claim 9, wherein the load-detecting strain gages are formed in combination with other strain gages for detecting torsional moment and bending moment on at least the upper surface or lower surface of the load-sensing member whereby said load-detecting strain gages are arranged parallel to an axis of the bending beam, and said other strain gages for detecting torsional moment and bending moment are arranged non-parallel to the axis of said bending beam.

11. A load cell which comprises a bending beam having a load-sensing member of ceramic material and load-detecting strain gages of thin-film resistance, said bending beam having a surface coated with amorphous glass to make the surface of said ceramic load-sensing member smooth and at least one which are formed said strain gages of thin-film resistance;
wherein the load-detecting strain gages are formed in combination with other strain-gages for detecting torsional moment and being moment on at least the upper surface or lower surface of the load-sensing member whereby said load-detecting strain gages are arranged parallel to an axis of the bending beam, and said other strain gages for detecting torsional moment and bending moment are arranged non-parallel to the axis of said bending beam.

12. A load cell which comprises a bending beam having a load-sensing member of ceramic material and load-detecting strain gages of thin-film resistance formed thereon, said bending beam having a surface coated with amorphous glass to make the surface smooth and at least on which are formed said strain gages of thin-film resistance, wherein the load-detecting strain gages are formed in combination with other strain gages for detecting torsional moment and bending moment on at least the upper surface or lower surface of the load-sensing member.

* * * * *

UNITED STATES PATENT AND TRADEMARK OFFICE
CERTIFICATE OF CORRECTION

PATENT NO. : 5,154,247
DATED : October 13, 1992
INVENTOR(S) : Yoshinobu NISHIMURA, Hiroshi TANAKA, Naoji NAKAMURA It is certified that error appears in the above-indentified patent and that said Letters Patent is hereby corrected as shown below:

On the title page, item [73] Assignee, should read --Teraoka Seiko Co., Limited, Tokyo, Japan and The Research Institute for Electric and Magnetic Materials, Sendai-shi, Japan--

Signed and Sealed this

Eighteenth Day of February, 1997

Attest:

BRUCE LEHMAN

*Attesting Officer*     *Commissioner of Patents and Trademarks*